United States Patent

Aagaard et al.

[15] 3,700,831

[45] Oct. 24, 1972

[54] HYBRID CIRCUIT

[72] Inventors: Einar Andreas Aagaard; Johannes Anton Greefkes; Adrianus Wilhelmus Maria van den Enden, all of Emmasingel, Eindhoven, Netherlands

[73] Assignee: U.S. Philips Corporation, New York, N.Y.

[22] Filed: Jan. 8, 1971

[21] Appl. No.: 105,023

[30] Foreign Application Priority Data

Jan. 13, 1970 Netherlands..............7000395

[52] U.S. Cl. ............................................179/170 NC
[51] Int. Cl. .............................H03f 3/62, H04b 1/58
[58] Field of Search ...........179/170 T, 170 NC, 81 A

[56] References Cited

UNITED STATES PATENTS 3,530,260 9/1970 Gaunt .................179/170 NC
3,453,395 7/1969 Englund..............179/170 NC

*Primary Examiner*—Kathleen H. Claffy
*Assistant Examiner*—William A. Helvestine
*Attorney*—Frank R. Trifari

[57] ABSTRACT

Hybrid circuit for coupling a two-direction transmission path with a one-direction transmitting path and a one-direction receiving path, the arrangement comprising a first amplifier whose input is connected to the receiving path and whose output is connected to the two-direction transmission path, a second amplifier whose input is connected to the two-direction transmission path and whose output is connected to the transmitting path and a third amplifier whose input is connected to the receiving path and whose output is connected to the transmitting path, wherein the second amplifier is a direct-voltage differential amplifier and the first amplifier comprises a balanced direct-voltage-coupled output, while a damping network is connected between the two-direction transmission path and the input of the second amplifier.

2 Claims, 3 Drawing Figures

INVENTORS
EINAR A. AAGAARD
JOHANNES A. GREEFKES
ADRIANUS W.M. VAN DEN ENDEN
BY

AGENT

*INVENTORS*
EINAR A. AAGAARD
JOHANNES A. GREEFKES
ADRIANUS W.M. VAN DEN ENDEN
*BY*
Frank R. Trifari
AGENT

HYBRID CIRCUIT

The invention relates to a hybrid circuit for coupling a two-direction transmission path with one-direction transmitting path and a one-direction receiving path, said arrangement comprising a first amplifier whose input is connected to the receiving path and whose output is connected to the two-direction transmission path, a second amplifier whose input is connected to the two-direction transmission path and whose output is connected to the transmitting path and a third amplifier whose input is connected to the receiving path and whose output is connected to the transmitting path.

Such a hybrid circuit is known from U.S. Pat. No. 2,511,948.

The invention has for its object to provide a hybrid circuit of the kind set forth, which is adapted to the balanced speech-signal transmission, the hook and dial signalling, the ringing signalling and the method of line current supply employed for subscriber lines to which conventional subscriber sets are connected and which is protected from induction voltages in the subscriber lines.

The hybrid circuit according to the invention is characterized in that the second amplifier is a direct-voltage differential amplifier and the first amplifier comprises a balanced direct-voltage-coupled output and in that a damping network is connected between the two-direction transmission path and the input of the second amplifier.

The invention and its advantages will be described more fully with reference to the Figures.

Therein:

Figure 1:
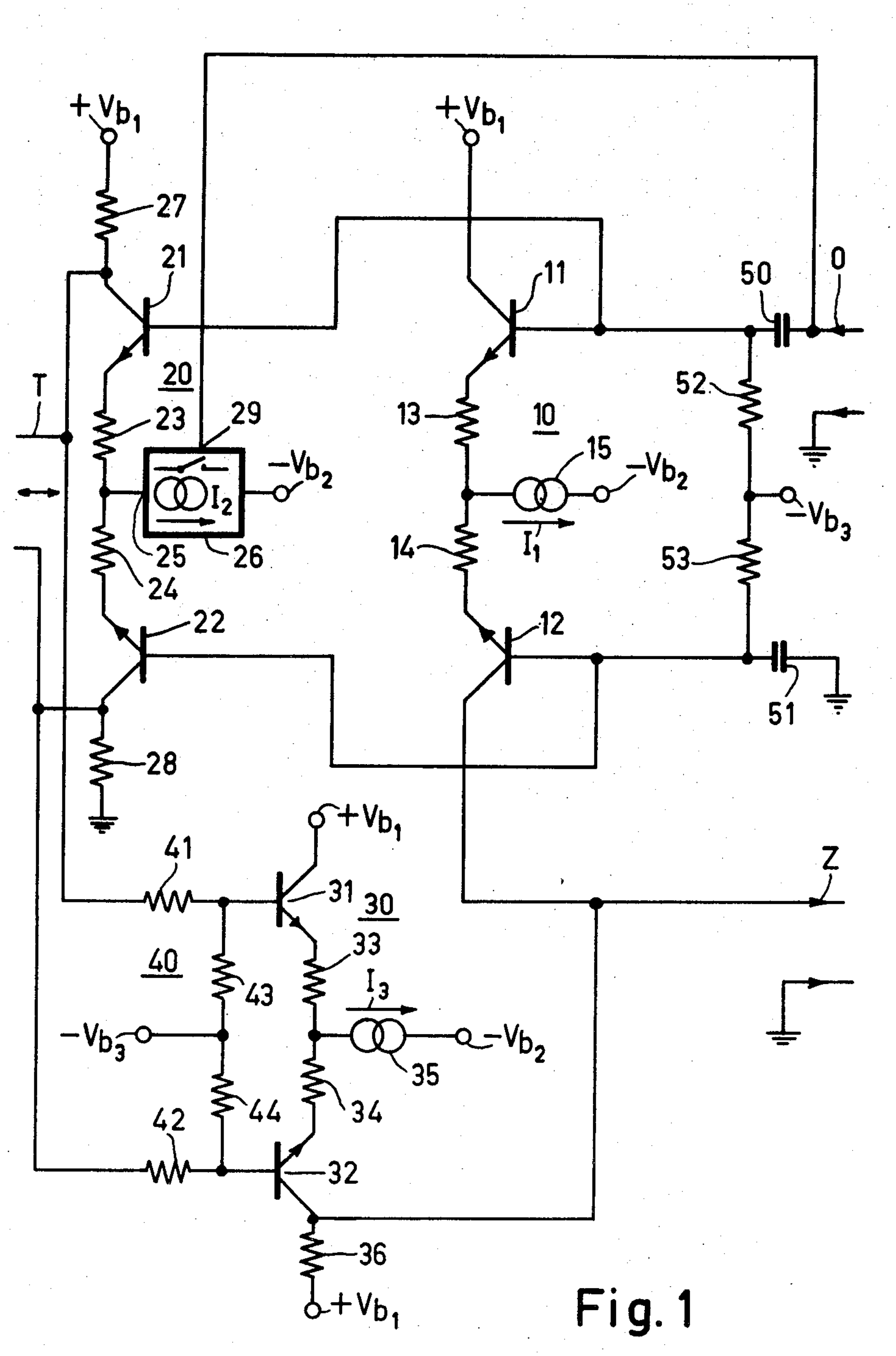
FIG. 1 shows an embodiment of the hybrid circuit according to the invention.

FIG. 1 shows a two-direction transmission line T, along which signals are transmitted in the two directions. The transmission line T is in this example a subscriber line of a telephone exchange. FIG. 1 shows furthermore a one-direction transmission line O, along which signals are applied to the hybrid circuit and a one-direction transmission line Z, along which signals are transmitted from the hybrid circuit. These lines form the receiving path and the transmitting path respectively of a so-called four-wire transmission path.

The receiving path O is connected to the input of an amplifier 10 and to the input of an amplifier 20. The subscriber line T is connected to the output of the amplifier 20 and through a damping network 40 to the input of an amplifier 30. The output of the amplifier 30 and the output of the amplifier 10 are both connected to the transmitting path Z. The amplifier 10 supplies at its output such a signal that the signal which passes through the amplifier 20, the damping network 40, the amplifier 30 to the transmitting path Z is compensated for.

The amplifier 20 is formed by the transistors 21 and 22, the emitters of which are connected through equal resistors 23 and 24 to the output 25 of a switchable current source 26. The control-input of this current source is connected to the receiving path O. When the signal received from the receiving path O exceeds a give amplitude threshold, the current source 26 switches on.

In the switched-on state the current source 26 conveys a constant current $I_2$ from the junction of the emitter resistors 23 and 24 to a supply point having a voltage of $-Vb_2$ Volt. The collector of transistor 21 is connected through a collector resistor 27 to a supply point having a voltage of $+Vb_1$ Volt, for example $Vb_1 = Vb_2$. The collector of transistor 22 is connected through a collector resistor 28 to earth. One conductor of subscriber line T is connected to the collector of transistor 21 and the other conductor is connected to the collector of transistor 22. The collector resistor 27 has the same value as the collector resistor 28. The subscriber line T receives via these resistors a symmetrical direct-voltage supply, as is desired for the microphone and the hook signalling of conventional subscriber sets.

The amplifier 10 is formed by the transistors 11 and 12, the emitters of which are connected via equal emitter resistors 13 and 14 to a current source 15. This current source conveys a constant current $I_1$ from the junction of the emitter resistors 13 and 14 to a supply point having a voltage of $-Vb_2$ Volt. The collector of transistor 11 is connected to the supply point having a voltage of $+Vb_1$ Volt. The collector of transistor 12 is connected to the non-earth-connected conductor of the transmitting path Z.

The base electrodes of the transistors 21 and 11 are connected to each other ans through a capacitor 50 to the non-earth-connected conductor of the receiving path O. The base electrodes of the transistors 22 and 12 are connected to each other and via capacitor 51 to earth. The base bias voltages for the transistors 11, 12 and 21, 22 are derived from a supply point having a voltage of $-Vb_3$ Volt, for example $-Vb_3 = (-Vb_2 + 4)$Volt, which is connected via the resistors 52 and 53 to the base electrodes of the transistors 11, 21 and 12, 22 respectively.

The amplifier 30 is formed by the transistors 32 and 32, the emitters of which are connected through equal emitter resistors 33 and 34 to a current source 35. This current source conveys a constant current $I_3$ from the junction of resistors 33 and 34 to a supply point having a voltage of $-Vb_2$ Volt. The collector of transistor 31 is connected to a supplypoint being having a voltage of $+Vb_1$ Volt. The collector of transistor 32 is connected through a collector resistor 36 to a supply point having a voltage of $+Vb_1$ Volt. This collector is furthermore connected to the non-earth-connected conductor of the transmitting path Z, the latter conductor being also connected to the collector of transistor 12.

The conductors of the subscriber line T are connected through the resistors 41 and 42 of the damping network 40 to the base electrodes of the transistors 31 and 32. Between these base electrodes are connected the resistors 43 and 44 of the damping network 40. The junction of the resistors 34 and 44 is connected to a supply point having a voltage of $-Vb_3$ Volt for supplying a base bias voltage to the transistors 31 and 32.

The amplifier 20 converts the unbalanced signal from the receiving path O into a balanced signal across the subscriber line T. The amplifier 30 converts the balanced signal from the subscriber line T into an unbalanced signal across the transmitting path Z. Thus the hybrid circuit is adapted to the conventional form of speechsignal transmission on subscriber lines.

The amplifier 30 has a differential input and is only sensitive to signals which produce differences between the base currents of transistors 31 and 32. Disturbances introduced into the subscriber line T by adjacent power current mains or by lightening give rise to longitudinal currents through the subscriber line T. These currents have the same strength and sense in the two conductors of the subscriber line T and affect the transistors 31 and 32 in the same manner. Variations of the base voltages of the transistors 31 and 32 having the same phase are not amplified, since the effective resistance in the emitter circuits for these variations is very high due to the use of current source 35.

The damping network 40 connected between the subscriber line T and the input of the amplifier 30 attenuates the interferences and protects amplifier 30 from excessively high voltages at the input.

The amplifier 30 is a direct-voltage amplifier so that signalling with the hook and the dial of the subscriber set connected to the subscriber line T can be detected in the transmitting path Z. Number signalling by the method in which resistors are switched into the subscriber loop can also be detected in the transmitting path Z. The polarity reversals of the supply voltage that are required to detect the selected digits may be obtained by driving into saturation alternately transistor 21 and transistor 22 by a signal applied to the receiving path O.

The amplifier 20 is capable, under the control of signals supplied by the receiving path O, of applying voltages to the subscriber line T with an amplitude of the order of magnitude of the supply voltage of $+Vb_1$ volt. It is thus possible to actuate via the hybrid circuit a conventional ringing device.

The current source 26 is switched off when the receiving path O is in the condition in which no signals are applied thereto. In this condition of the receiving path O the amplifier 20 has a very low dissipation. A practical hybrid circuit arrangement has a dissipation of less than 100 mW in the said condition of receiving path O.

By choosing such a capacitance value for the capacitors 50 and 51 that their impedances are low as compared with the resistors 52 and 53 to the lowest frequencies an amplitude-frequency transmission characteristic line of the hybrid circuit between the receiving path O and the subscriber line T can be realized, which extends substantially as far as zero Hz. The amplitude-frequency characteristic between subscriber line T and the transmitting path Z includes the frequency of zero Hz or DC, since a direct-voltage amplifier connected therebetween.

A transmission circuit having a transmission characteristic starting at zero Hz and having an amplitude range from very low amplitudes to a very high amplitudes, the latter being of the order of magnitude of the supply voltage, is termed a transpatent circuit. For all practical purposes the hybrid circuit shown in FIG. 1 is a transparent transmission circuit. Such transparent hybrid circuits may advantageously be emplpyed in the peripheral apparatus of electronic telephone systems using four-wire interconnecting channels.

Figure 2:
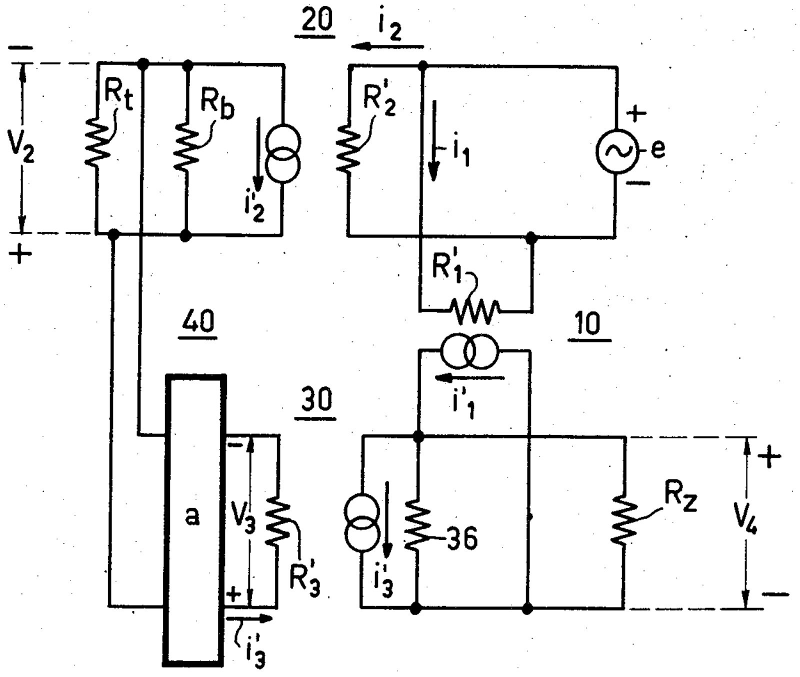
FIG. 2 shows an equivalent circuit diagram.

FIG. 2 shows the AC-equivalent circuit diagram of the hybrid circuit shown in FIG. 1 for deriving the balance condition.

The amplifier 10 is replaced by an input resistance of $R'_1$ Ohms and an output current source having a current of $i'_1$ Amps. $R'_1 = bR_1$ and $i'_1 = bi_1$, wherein $b$ is the amplification factor, $R_1$ is the sum of the resistance values of the emitter resistors 13 and 14 and $i_1$ is the current through the input resistor. The amplifiers 20 and 30 are replaced in a similar manner by an input resistance and an output current source. The resistance of $R_t$ ohms replaces the input impedance of the subscriber line T as viewed from the hybrid circuit. The resistance of $R_b$ ohms replaces the collector resistors 27 and 28. The resistance of $R_z$ ohms replaces the input impedance of the transmitting path Z as viewed from the hybrid circuit. The damping factor of the damping network 40 is represented by $a$.

The voltage source having a voltage $e$ replaces the signal of receiving path O. From the equivalent circuit and the above the following equations may be derived:

$$i'_1 = b_1 = be/R'_1 = be/bR_1 = e/R_1 \quad (1)$$

In the same manner as in (1):

$$i'_2 = e/R_2 \quad (2)$$

$$V_2 = i'_2 \cdot (Rb \cdot Rt)/(Rb + Rt) \quad (3)$$

$$V_3 = a \cdot V_2 \quad (4)$$

In the same manner as in (1):

$$i'_3 = V_3/R_3 \quad (5)$$

The substitution of (2), (3), and (4) in (5) provides:

$$i'_3 = a/R_3 \,.\, e/R_2 \cdot (Rb.Rt)/(Rb+Rt) \quad (6)$$

In the balanced condition it has to apply that $V_{44} = 0$. This condition is satisfied when: $i'_1 = i'_3$ From (1) and (6) follows the balance condition:

$$a.\,(Rb.Rt)/(Rb+Rt) = R_3 \,.\, R_2/R_1 \quad (7)$$

When the subscriber line T has a characteristic impedance Ro and the subscriber line is terminated by an impedance equal to the characteristic impedance and if Rb = Ro, the balance condition (7) is reduced to $$aRo/2 = R_3.R_2/R_1$$

If the subscriber line has a characteristic impedance Zo, which is not a resistance, the condition (8) remains valid upon substituting Zo for Ro, when the collector resistors 27 and 28 of FIG. 1 are replaced by the impedances Zo/2. The balance condition (8) may be satisfied by connecting into the emitter circuits of the transistors 21, 22 or 31, 32 complex impedances proportional to Zo.

Figure 3:
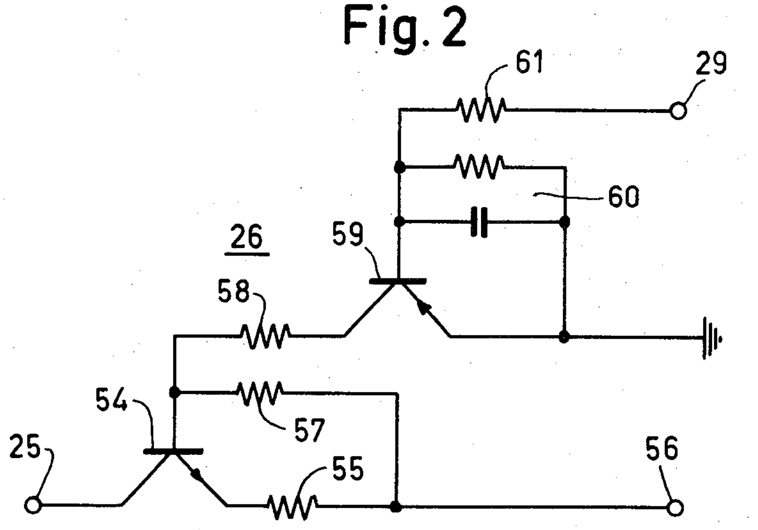
FIG. 3 shows an embodiment of a switchable current source.

FIG. 3 shows an embodiment of the switchable current source 26 of FIG. 1. The current source comprises an npn-transistor 54, the collector of which is connected to the output 25 and the emitter of which is connected through an emitter resistor 55 to the supply terminal 56. The base electrode is connected through a base resistor 58 to the supply terminal 56 and through a base resistor 58 to the collector of a PNP-transistor 59. The emitter of this transistor is connected to earth. The base electrode is connected to earth through the RC-network 60 and is connected through the base resistor 61 to the control-input 29. When the control-input 29 receives a control-signal exceeding the base-emitter threshold voltage of transistor 59, the latter conveys a collector current. This collector current operates as a base current for the transistor 54. With adequate strength of the control-signal transistor 54 is driven to saturation by the collector current of transistor 59. In this condition the transistor 54 conveys a substantially constant current from the output 25 to the supply terminal 56. The resistors of the emitter and base circuits of transistor 54 operate as elements determining the current.

What is claimed is:

1. A hybrid circuit arrangement for coupling a two-direction transmission path with a one-direction transmitting path and a one-direction receiving path, said arrangement comprising a first amplifier whose input is connected to the receiving path and whose output is connected to the two-direction transmitting path, a switchable current source connected to the first amplifier and coupled with the receiving path for providing current to the first amplifier in response to a voltage in the receiving path in excess of a threshold value, a second amplifier whose input is connected to the two-direction transmission path and whose output is connected to the one-direction transmitting path and a third amplifier whose input is connected to the receiving path and whose output is connected to the transmitting path, characterized in that the second amplifier is a direct-voltage differential amplifier and the first amplifier comprises a balanced direct-voltage-coupled output and in that a damping network is connected between the two-direction transmission path and the input of the second amplifier.

2. A hybrid circuit arrangement for coupling a two-direction transmission path with a one-direction transmitting path and a one-direction receiving path, said arrangement comprising a first two-transistor amplifier having an input connected to the receiving path, each transistor of the first amplifier having an emitter connected to a current source, means connecting the collectors of the transistors of the first amplifier to the two-direction transmission path, and means connecting the collectors of the transistors in the first amplifier to different points of constant potential.

* * * * *